April 22, 1941.   F. O. CARLSON   2,239,454
SCORING CUTTER
Filed Oct. 20, 1939   2 Sheets-Sheet 1
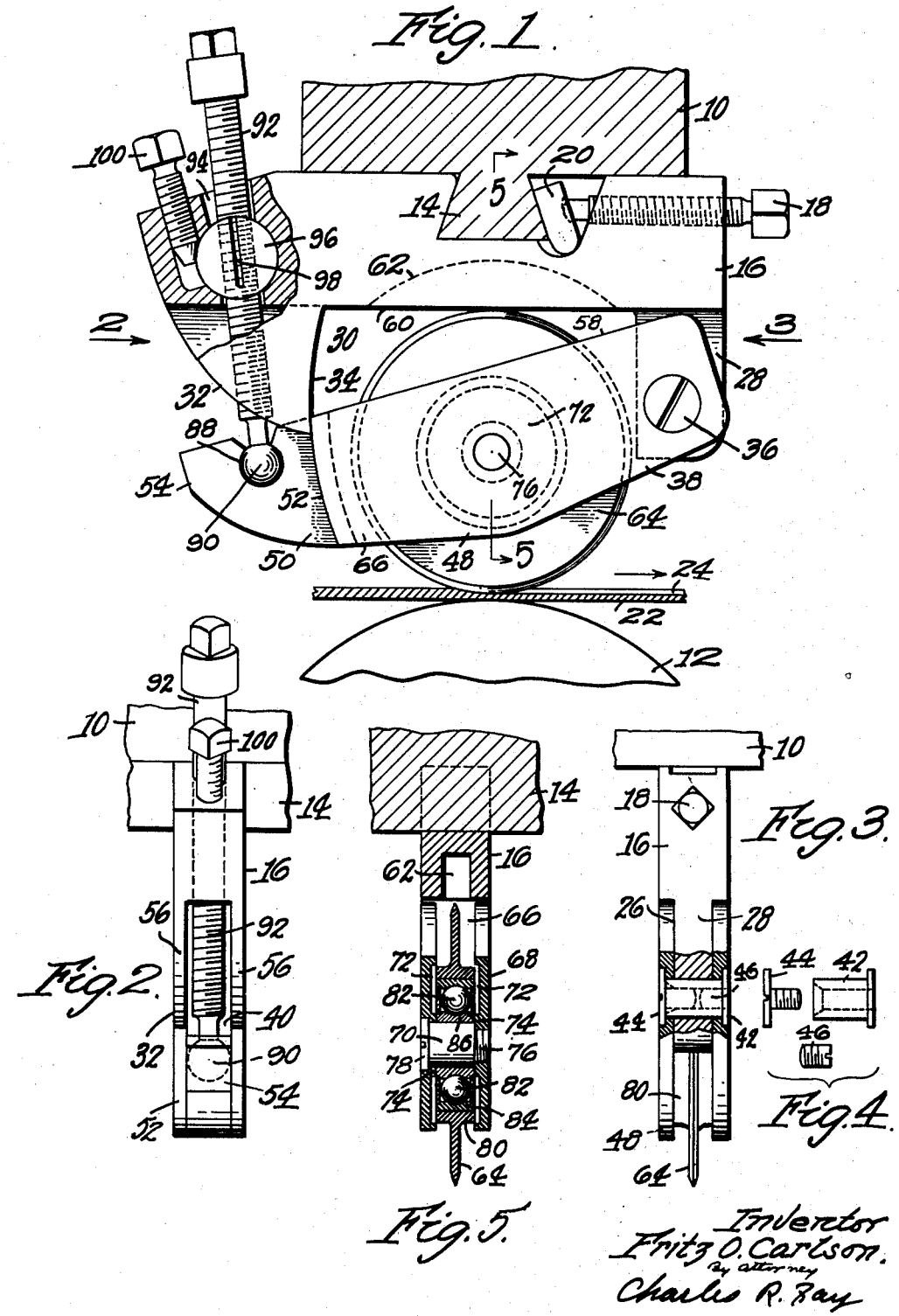

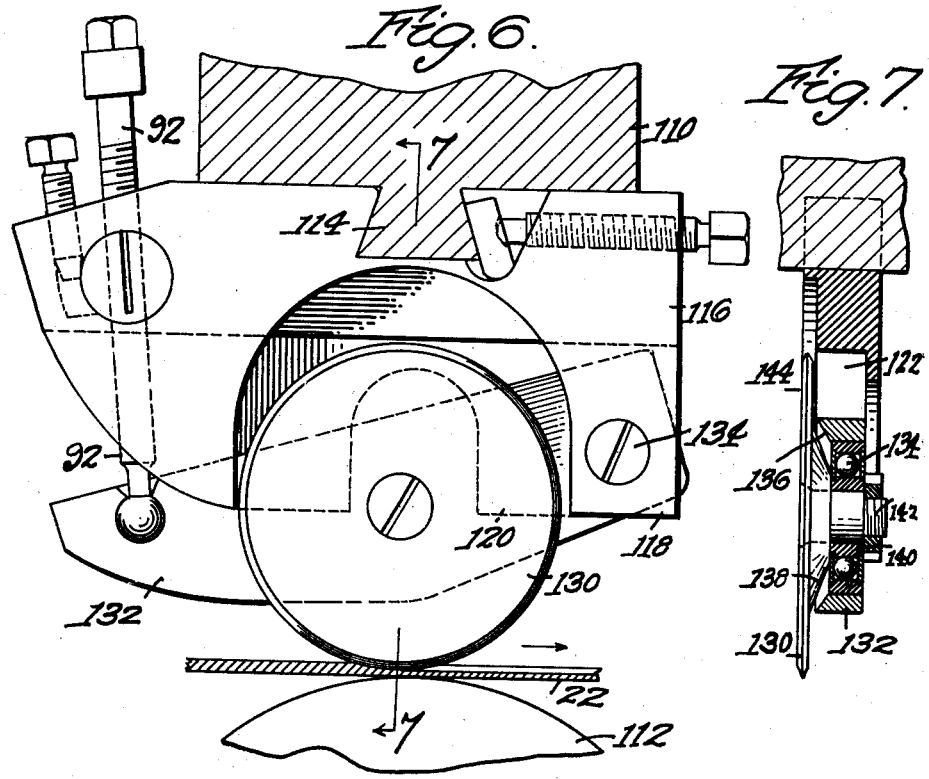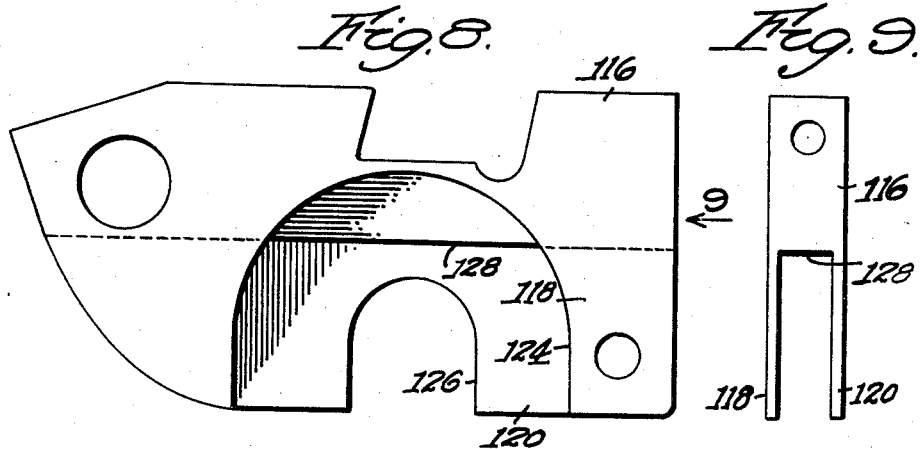

Patented Apr. 22, 1941

2,239,454

UNITED STATES PATENT OFFICE 2,239,454

SCORING CUTTER

Fritz O. Carlson, Worcester, Mass., assignor to Hobbs Manufacturing Company, Worcester, Mass., a corporation of Massachusetts Application October 20, 1939, Serial No. 300,450

10 Claims. (Cl. 164—60)

The subject matter of this invention relates to a rotatably mounted cutter and an adjustable support therefor, the cutter being adapted for use in the scoring of cardboard or other analogous material or for the slitting or indenting of various materials as may be desired.

The objects of this invention include the provision of a rotatably mounted cutter having a pivoted holder which is mounted on a support detachably connected to a cutter bar; the provision of a rotatable cutter mounted on a pivoted holder which is in turn mounted on a stationary support, the pivoted holder and the stationary support being of the same width and having their side surfaces in the same planes, the pivoted holder being adjustably mounted within the confines of the stationary support; the provision of an adjustable scoring cutter embodying a new and improved means of adjustment therefor comprising a screw having a clamp of a construction which avoids any injury to the threads in the screw; and the provision of a new and improved scoring cutter support which allows a much larger and stronger bearing to be used, while avoiding any increase in the size of the support.

Other objects and advantages of the invention will appear hereinafter.

Reference is to be had to the accompanying drawings, in which—

Fig. 1 is a side elevation of the device embodying the present invention, parts being in section;

Fig. 2 is a front elevation of the device shown in Fig. 1, looking in the direction of arrow 2;

Fig. 3 is a rear elevation of the device shown in Fig. 1, looking in the direction of arrow 3;

Fig. 4 is a detailed view of the pivot connection for the cutter support;

Fig. 5 is a sectional view on the line 5—5 of Fig. 1;

Fig. 6 is a side elevation of a modification of the invention;

Fig. 7 is a sectional view on the line 7—7 of Fig. 6;

Fig. 8 is a side elevation of a supporting member for the cutter shown in Fig. 6; and Fig. 9 is an end elevation of the member shown in Fig. 8, looking in the direction of arrow 9.

In the drawings, the cutter bar 10 and the scoring roll 12 are of conventional construction and are well known in the art. The cutter bar is provided with a dove-tail extension 14 extending longitudinally thereof and the stationary part 16 of the cutter support is secured on the dove-tail extension at any longitudinal position thereof by means of a screw 18 and a gib 20. It will be seen that a plurality of cutters and supports therefor may be secured to the dove-tail extension 14 and such supports may be arranged at any distance from each other to provide the necessary scores in the material 22. The supports 16 may even be arranged in contacting relation so that the scores 24 may be made very close together if desired, and the width thereof is substantially the same as the width of supports of the prior art.

The stationary part 16 of the cutter support comprises a one-piece casting or forging of uniform width, as shown for instance in Fig. 2, except where it is recessed at one end at 26 to provide for the depending lug 28, which, as shown in Fig. 3, is narrower than the part 16 and is laterally centrally located. Immediately forward of the depending lug 28, there is provided a transverse recess 30 seen in Fig. 1 and this recess extends forwardly to an integral depending guide element 32, the sides of which are of the same width as the part 16. The depending guide element has an interior wall 34 which is formed on an arc of a circle, the center of which is the pivot 36 for the pivoted cutter holder 38, and this element also is provided with a central recess 40.

The pivoted cutter holder 38 is connected to the depending lug 28 by its pivot 36 which comprises an internally screw threaded and headed barrel 42 having a headed set screw 44 threaded therein at one end and a screw 46 threaded in at the other end. The cutter holder 38 is provided with a forked end 48 which fits over and receives the depending lug 28, being pivoted thereto as aforesaid. It will be noted that each element of the fork 48 just fills its corresponding recess 26 so that the entire cutter holder 38 and its fork 48 are of just the same width as the part 16. The heads of the fastenings 42 and 44 are countersunk into the opposite elements of the fork 48 and thus it is seen that the entire assembly is of uniform width and has no projections extending from the sides thereof, whereby it becomes possible to mount two cutter supports in contacting relation in order to make two scores very close together, the distance between such scores being the same as the width of the support.

The forward end of the cutter holder 38 is laterally recessed at 50 so that it may fit and slide within the center recess 40 in the dependent guideway 32. The shoulders 52 forming the limit of the recess 50 are made on the arc of a circle having its center at the pivot 36 like the curve 34, and the shoulders 52 thus fit and are guided by the curved rearward limit 34 of the guide 32, and the forward recessed portion 54 of the cutter holder 38 is of such a width as to be closely guided by the sides 56 formed by the recess 40 in the guide 32. This construction provides an extremely stable guide means for the pivoting movement of the holder 38 and it will be seen that the latter may only move exactly in this guide, assisted in the guiding movement by the close fit of the element 28 and the fork 48.

The upper surface 58 of the holder 38 is generally plane, and the surface 60 forming the upper limit of the recess 39 acts as a stop therefor in the upward movement of the holder 38.

The supporting part 16 is grooved as at 62 to accommodate the blade 64 in its upper limit of adjustment.

Referring more particularly now to Fig. 5, it will be seen that the holder 38 is provided with the slot 66 formed by the elements of the fork 48, and this slot extends from the top to the bottom of the holder for the purpose of mounting the cutter 64. The walls 68 formed by the fork 48 are provided with alined apertures for the reception of the pin 70 which holds the cutter 64 in the holder 38, and the inside faces of the walls 68 are provided with annular grooves 72 for a purpose to be described. These grooves 72, which are concentric with respect to the pin 70, result in annular shoulders 74 between the apertures and the grooves. The pin 70 comprises a screw threaded portion 76, a head 78, and a barrel therebetween, the portion 76 to be threaded in its cooperating aperture in its wall 68, and the head is countersunk in the opposite wall 68.

The cutter 64 comprises a thin disc having an annular widened portion 80 which is provided with a circular aperture for the reception of a ball bearing 82. The outer race 84 of this bearing is press fitted into the aperture in the cutter, and the inner race 86 is of a size and width to just fit between the shoulders 74. Also, the width of the portion 80 and of the outer race 84 is designed to just fit between the unrecessed portions of the walls 68 while the diameter of the portion 80 is just a little smaller than that of the recesses 72.

With the above described construction in mind, it will be seen that the assembled cutter and bearing can be slid into the slot 66, and the inner race 86 alined with shoulders 74. Then the fastening 70 is threaded in place, and the inner race is secured between the shoulders 74, while the cutter 64 and outer race 84 may turn freely.

Referring now to Fig. 1, it will be seen that the forward end 54 of the holder 38 is recessed as at 88 to accommodate the spherical end 90 of an adjusting screw 92 which extends thru an aperture 94 in the part 16 and thru the recess 40 in the guide 32. The screw 92 passes thru a correspondingly threaded cylindrical stud 96 located in a transverse cylindrical opening in the part 16. The stud 96 is provided with a transverse slit 98, this slit extending longitudinally of the screw 92 and providing a clamp therefor. Located in a threaded bore in the part 16, there is provided a binding screw 100 which bears against one side of the stud 96. It will be seen that the screw 100 being loosened, the adjusting screw 92 may be turned to elevate or depress the cutter holder 38, and when in desired position, the screw 100 may be tightened to compress the two edges of the cylindrical stud 96 to bear upon the adjusting screw 92 and thereby lock the same. It will be seen that this construction provides a positive locking means for the adjustment of the holder 38 and also at the same time avoids any damage to the threads in the screw 92 since these threads will be clamped in a radial direction instead of a longitudinal direction of the screw 92. It is to be noted that if screw 100 is tightened, and a turning force is then accidentally applied to the screw 92, the threads of the latter will not be injured or deformed out of shape, even though the clamp 96 is tight.

In the modification of the device, as shown in Figs. 6 and 7, the same cutter bar 110 and scoring roll 112 are used as in the first instance, as well as the dove-tail extension 114. In this case, however, the stationary bar 116 is modified by having two depending side walls 118 and 120 which are spaced to provide an opening 122 therebetween. In the wall 118, there is a large opening 124 which is approximately semicircular and the wall 120 has a smaller opening 126 of somewhat the same shape. The opening 124 extends above a bottom wall 128 which extends between the walls 118 and 120 so as to provide for the most upward adjustment of the cutter 130. The cutter holder 132 is pivoted as at 134 between the rearward extremity of the two walls, and at its forward end the holder is provided with the same adjusting screw 92, as in the modification shown in Fig. 1.

As shown in Fig. 7, the cutter holder 132 is apertured to provide for a bearing 134 in which the cutter 130 is mounted for rotation. The holder 132 may be beveled, as at 136, and the cutter itself may be provided with a circular beveled extension 138 to fit into the beveled portion of the holder and to be forced up against and secured to the inner race 140 of the bearing by the connection 142 which acts as a clamp for the parts. Of course, it is to be understood that the bevel 136 and the extending portion 138 are not necessarily employed, but the bearing 134 may extend the full width of the holder 132 so that a flat blade may be used instead of that shown in Fig. 7.

This construction provides for a large sturdy bearing and a strong support therefor and allows the use of a thin blade 130 whose outer plane surface 144 is located in the same plane as the outer surface of the wall 118. This construction thus allows the formation of a score as close as possible to the outside surface of the wall 116, as can be made. Comparing Figs. 5 and 7, it will be seen that the modification shown in Fig. 7 may be connected to the cutter bar 10 very close to either wall 68, as shown in Fig. 5, thus providing for making two scores extremely close together; i. e., at a distance apart approximately one half the width of either one of the assemblies shown. Also, the blade 130 may be located extremely close to any abutment which may be present in the machine, and therefore a score may be made closer to an edge of the material 22 than has been possible heretofore.

Having thus described my invention and the advantages thereof, I do not wish to be limited to the details herein disclosed, otherwise than as set forth in the claims, but what I claim is:

1. In a device of the class described, the combination of a support having parallel side surfaces, and depending elements at each end of the support, with a cutter holder pivoted to one said depending element, said holder having parallel side surfaces each being in the same plane as its corresponding side surface of the support, cooperating guide surfaces between the other depending element and said holder, and a slot in the holder to provide walls for the reception of a bearing having a disc cutter mounted thereon, means to secure the inner race of the bearing to the walls of the holder, said means stopping short of either side surface of said holder.

2. In a cutter support assembly, a holder having a slot therethru providing side walls therein, alined annular recesses in the inner faces of said walls, said recesses providing alined shoulders at the centers thereof, a cutter disc located in the slot and having a central thickened portion, said portion being of a width substantially the same as that of the slot, a bearing in the center of said thickened portion alined with said shoulders, means to clamp the bearing between the shoulders, the annular recesses accommodating the thickened portion of said cutter whereby the latter is free to rotate on its bearings.

3. In a device of the class described, the combination of a holder having a slot therethru providing side walls therein, alined apertures in said walls, annular recesses in the inner faces of said walls and concentric with said apertures, said recesses providing annular shoulders between each aperture and its corresponding recess; with a cutter disc comprising a thin cutting area, a laterally widened ring inwardly of the cutting area, a bearing located within said ring and having an inner race, said race being of a width to just fit between said annular shoulders, and means in the apertures in said walls to urge said shoulders together to clamp said inner race.

4. In a device of the class described, the combination of a holder having a slot therethru providing thin side walls therein, alined apertures in said walls, annular recesses in the inner faces of said walls and concentric with said apertures, said recesses providing annular shoulders between each aperture and its corresponding recess; with a cutter disc comprising a thin cutting area, a laterally widened ring inwardly of the cutting area, a bearing located within said ring and having an inner race, said race being of a width to just fit between said annular shoulders, and means in the apertures in said walls to urge said shoulders together to clamp said inner race, said ring being of a width substantially equal to the width of said holder slot, and located between said recesses.

5. In a device of the class described, the combination of a support having a transverse recess in the bottom edge thereof forming depending elements at each end of the support, one element being laterally recessed at each side and the other element being centrally recessed from the bottom thereof, the inner edge of the latter element being formed on the arc of a circle having its center at a point in said laterally recessed element; with a cutter holder having a slot to receive said laterally recessed element and a pivot connection between the latter and the holder at said point, the forward edge of said holder being laterally recessed to be slidable within the centrally recessed element, the shoulders formed by the recesses in the forward edge of the holder being formed on an arc of the said circle to fit and be guided by the inner edge of the centrally recessed member.

6. In a device of the class described, the combination of a support having plane parallel side surfaces, a recess in said support extending from the bottom thereof upwardly to approximately a central position in said support thus providing depending elements at each end of said support, one of said elements being laterally recessed on each side thereof, the other element being centrally recessed to form a slot therein, an aperture thru said laterally recessed element, the inner face of said centrally recessed element being curved on an arc of a circle whose center is located in the aperture in said laterally recessed element; with a blade holder having parallel plane surfaces and a fork at one end thereof receiving the laterally recessed element, means extending between the elements of said fork and thru the aperture in said laterally recessed element pivoting the blade holder to the support, the other end of said blade holder being laterally recessed to such a degree as to closely fit within the recess of the centrally recessed element, the recesses on said blade holder forming shoulders which are curved on an arc of a circle whose center is located in the aperture in the laterally recessed element of the support, whereby the curved surface of the centrally recessed element and the curved shoulders on the blade support form a guide means for the latter in its pivotal movement, said blade support having a slot extending therethru parallel to its side surfaces thus forming parallel walls therein, said walls each being recessed on its inner face to accommodate a disc cutter having a portion which is as wide as the distance between the unrecessed portions of said walls, and means to rotatably support said cutter between said walls.

7. In a device of the class described, the combination of a support having a longitudinal recess extending from its bottom edge to a line approximately midway the height thereof; with a relatively wide holder pivoted between the walls provided by said recess and having a bearing centrally located therein, a thin cutter blade attached to said bearing and having a plane surface approximately in the plane of one side of said support, said plane surface of said cutter extending substantially the width thereof.

8. In a device of the class described, a support having a longitudinal recess in the bottom edge thereof and providing two parallel walls, a substantially semicircular recess centrally located in one wall inwardly from the bottom edge thereof, a relatively wide cutter holder pivoted between the walls and having a bearing therein, a cutter disc mounted to rotate on said bearing, said disc being thin and substantially flat sided, said semicircular recess extending above the upper limit of said longitudinal recess to accommodate said flat disc in its upmost position.

9. In a device of the class described, a support having a longitudinal recess in the bottom edge thereof and providing two parallel walls, a substantially semicircular recess centrally located in one wall inwardly from the bottom edge thereof, a relatively wide cutter holder pivoted between and bearing against the walls and having a bearing therein, a cutter disc mounted to rotate on said bearing, said disc being thin and substantially flat sided, said semicircular recess extending above the upper limit of said longitudinal recess to accommodate said flat disc in its upmost position, said disc having one flat side substantially in the plane of the corresponding side of said support.

10. In a device of the class described, the combination of a support having parallel side surfaces, and depending elements at each end of the support, with a cutter holder pivoted to one said depending element, said holder having parallel side surfaces each being in the same plane as its corresponding side surface of the support, cooperating guide surfaces between the other depending element and said holder, and a slot in the holder to provide walls for the reception of a bearing having a disc cutter mounted thereon, means to secure one of the races of the bearing to the walls of the holder.

FRITZ O. CARLSON.